United States Patent Office 2,961,400
Patented Nov. 22, 1960

2,961,400

CONTROL OF SWELLING OF SILICATES

Arthur Park, Tulsa, Okla., assignor to The Dow Chemical Company, Midland, Mich., a corporation of Delaware No Drawing. Filed Apr. 7, 1958, Ser. No. 726,647

9 Claims. (Cl. 252—8.55)

The invention concerns the treatment of argillaceous earth strata, i.e., those which contain silicates or clay materials, and more particularly concerns the reduction of the swelling of silicate materials when contacted by an aqueous treating liquid during such treatment.

The production of fluids such as oil, gas, and aqueous solutions, e.g., brine and potable water, from fluid-bearing earth strata traversed by a wellbore has been increased by fracturing, that is, by injecting a liquid into the well and forcing it into the strata to produce sufficient pressure therein to force apart portions thereof, thereby opening up communicating passageways leading from the fluid-producing strata to the wellbore. A propping agent such as a 20-60 mesh sand is usualy suspended in the fracturing liquid and thereby carried into the newly formed passageways to hold open the passageways so formed.

A number of fracturing liquids are known, among which are fresh water, aqueous solutions, and oil-water emulsions. Fracturing of argillaceous strata wherein such fracturing liquid containing water is used to increase production therefrom is a common practice. Among the most common argillaceous or clay substances occurring in or in communication with fluid-producing earth strata are montmorillonite, kaolinite, and illite.

Water, an aqueous solution, or an oil-water emulsion causes argillaceous or silicate material with which it comes in contact to swell. Such swelling of silicates in strata being fractured is highly undesirable because it tends to close up the newly formed channels or passageways, thereby decreasing the permeability and, therefore, to a more-or-less extent, defeating the objects of the fracturing operation. It can be seen, therefore, that in attempts to fracture earth strata where an aqueous treating liquid comes into contact with argillaceous material that the results may very well be a decrease rather than an increase in production.

It is a common practice in the production of fluids from the earth to produce pressures in the producing formation to urge the fluid in the direction of a producing well by injecting water or an aqueous solution such as a brine into the formation at some distance from the producing well to produce what is known as a water drive. The aqueous liquid employed in the water drive often passes through argillaceous material. The resulting swelling effect on the existing passageways in the argillaceous material thereby tending to obstruct them gradually increases the pressure required for the injection of the drive liquid and/or decreases the pressure within the formation until the drive becomes relatively ineffective.

A need, accordingly, exists for an aqueous well-treating liquid useful for fracturing argillaceous strata traversed by a wellbore and for providing water drive in an injection well which, when compared to water and known aqueous treating liquids, has a substantially reduced effect upon the swelling of the argillaceous material and for a method of using such treating liquid.

Consequently, an object of the invention is to provide an improved method of treating argillaceous earth strata which are penetrated by or are in communication with a wellbore. A further object is to provide a treating liquid useful in fracturing argillaceous earth strata and providing water for water drive operations.

These and related objects are made clear in the following description of the invention.

The invention is a method of treating subterranean argillaceous strata and an aqueous liquid, useful in such method, which contains a water-soluble cellulose derivative.

Cellulose may be considered a natural long chain polymer existing in abundance in plant life. Although the terminal molecules of a cellulose chain have four hydroxyl groups, the intermediate molecules have but three hydroxyl groups and, therefore, cellulose, is usually given the emperical formula of $(C_6H_{10}O_5)_n$ or more often $C_6H_7O_2(OH)_3$. Cellulose derivatives for use in practicing the invention are the water-soluble cellulose esters and ethers wherein an ester-forming or ether-forming organic group has been substituted for the hydrogen atom of hydroxyl groups in the cellulose chain, and salts of such ethers. One, two, or three hydroxyl groups of each cellulose molecule within the chain, or only an occasional group along the chain, may have been affected by the substitution reaction. The term water-soluble cellulose ethers and esters is well understood and methods of preparation thereof are well known in the art. The term includes those substances which are either soluble or dispersible in water or in an aqueous solution. The characteristics of the cellulose derivatives, particularly the solubility characteristics, are largely dependent upon the character of the group which has been substituted for the hydrogen and upon the extent of the hydrogen substitution in the hydroxyl groups. Water-soluble ethers and esters are well described in High Polymers, 2nd edition, vo ume V, part II. by Ott, Spurlin, and Grafflin (1954), published by Interscience Publishers, New York.

Table I below sets out certain types of cellulose derivatives useful in the practice of the invention and at least one example of each.

TABLE I

| Cellulose Derivatives | Example |
| --- | --- |
| Simple cellulose esters | Cellulose propi)nate. Cellulose butyrate. Cellulose acetate. |
| Mixed cellulose esters | Cellulose acetate butyrate. |
| Simple cellulose ethers | Methylcellulose. Ethylcellulose. Butylcellulose. |
| Hydroxyalkylcellulose ethers | Hydroxyethylcellulose. |
| Mixed cellulose ethers | Methylhydroxyethylcellulose. Methylhydroxypropylcellulose. |
| Carboxyalkylcellulose ethers | Carboxymethylcellulose. |
| Car )oxyalkylhydroxyalkylcellulose ethers. | Carboxymethylhydroxyethylcellulose. |
| Inorganic salts of a cellulose ether | Sodium carboxymethylcellulose. |
| Inorganic esters of cellulose | Nitrocellulose. |

Contrary to expectations based upon the known relatively low tolerance to polyvalent ions of certain of the above cellulose derivatives, e.g., the simple alkyl ethers of cellulose, it is a more or less unexpected discovery that such derivatives retain their beneficiating properties in an argillaceous earth formation for a sufficiently long time to accomplish the objects of the invention.

In selecting the cellulose derivative for use in accordance with the invention, it is recommended that the temperature of the argillaceous formation to be treated be taken into consideration. The cellulose derivatives employed should have a gel point above that of the highest temperature in the well through which the treatment is made. For example, carboxymethylcellulose and a number of mixed cellulose ethers, e.g., carboxymethylhydroxyethylcellulose, have relatively high gel temperatures and may be advantageously employed in those wells having a temperature even approximating that of boiling water. Simple ethers, on the other hand, are recommended only where the well temperature does not exceed about 100° F.

The operability of the process of the invention is independent of the viscosity grade of the cellulose derivative employed. So long as the viscosity is not so great that the cellulose cannot be dispersed in the treating liquid, it may be used in the invention. A viscosity grade in centipoises, as determined by testing a 2 percent aqueous solution at 20° C., of between 50 and 4000 is usually used. Viscosity grades above 4000 centipoises are not recommended because an uneconomical length of time is required for the dispersion at the temperatures usually employed.

The treating liquid may contain the customary inhibitors, fluid-loss preventives, and/or propping agents. It should have a pH value of between 5.5 and 11.0. The cellulose derivative is usually employed in an amount between 0.005 and 0.1 gram/100 ml. (between about 0.4 and 8.0 pounds per thousand gallons) of the treating liquid and preferably between 0.02 and 0.04 gram/100 ml. (between about 1.5 and 3 pounds of the cellulose derivative per thousand gallons) of the treating liquid.

After the cellulose derivative has been admixed with the fracturing liquid, the formation is fractured according to conventional procedure, i.e., by injecting the fracturing liquid into the formation, through a well drilled thereinto, at sufficient pressure to break down or fracture the formation and thereafter flushing out the well and putting it back into production.

Since among the most common argillaceous or clay materials which are found in and adjacent to fluid-producing zones in earth formations are montmorillonite, kaolinite, and illite, the effect of swelling on such clays caused by water, was determined by the following examples. A clay containing about 90 percent montmorillonite was used as illustrative of montmorillonite and, for simplicity of expression, is referred to hereinafter as montmorillonite. It showed the following oxides for which an analysis was made:

Oxide: Percentage by weight
SiO$_2$ ---------------------------------- 59.92
Al$_2$O$_3$ ---------------------------------- 19.78
Fe$_2$O$_3$ ---------------------------------- 2.96
CaO ---------------------------------- 0.64
MgO ---------------------------------- 1.53
Na$_2$O ---------------------------------- 2.06
K$_2$O ---------------------------------- 0.57
Water (lost at 110° C.) ---------------- 12.54

Aqueous solutions containing a cellulose derivative according to the invention and aqueous solutions without such derivatives were prepared. The three examples each consisted of three parts: A, B, and C. The results of the examples are summarized in Table II. Parts A and B were for comparison purposes and part C illustrates a practice of the invention.

The example summarized in Table II were performed as follows: A liquid vehicle consisting of one of kerosene (part A), fresh water (part B), or fresh water to which had been admixed a cellulose derivative (part C) was mixed in a blender. To the vehicle was added a known weight of each of the above clays, as explained below, in the amount set out in Table II. Since montmorillonite swells to a greater extent when in contact with water than either of the other two clays, it was employed in a lesser amount than the other two clays. Part A, wherein the kerosene was used, shows the volume occupied by the clay after the run in which little if any swelling had occurred. Part B, wherein the fresh water was used, shows the extent of swelling of clay in water alone. Part C, wherein a cellulose derivative was used in accordance with the invention, shows the effect on swelling of the clay suspended therein due to the presence of the cellulose derivative.

To carry out the examples, 500 milliliters of the vehicle were placed in a Waring blender. In part C of each example, as set out in Table II (that part which illustrates the use of a cellulose derivative in water to lessen the swelling effect on the clay), 0.02 gram of carboxymethylcellulose (CMC) was added per hundred milliliters of water and mixed for one minute. Thereafter, the weight of the clay set out in Table II was added to each of the vehicles and mixed in the blender at a high speed for five minutes to make a slurry of each.

Two aliquot samples of each of the slurries thus formed were then placed in graduated centrifuge tubes and centrifuged at 2000 r.p.m. for 10 minutes. The tubes and the procedures of the test are described in Test No. D96–52T ASTM standards (1952), part 5, pages 48–50. The clay in the slurries as a result of the centrifugation largely collected at the bottom of the tubes. The volume of the clay in the two samples as measured in milliliters was determined by averaging the two readings, and such average entered in the appropriate column of Table II.

TABLE II

*Swelling effect on clay*

| Example | Weight of Clay | Volume in Clay after Centrifugation | | |
|---|---|---|---|---|
| | | A In Kerosene | B In Water | C In Water + CMC |
| 1 | 0.2 g. montmorillonite | 0.3 | 2.0 | 0.3 |
| 2 | 1.0 g. kaolinite | 1.1 | 1.4 | 1.2 |
| 3 | 1.0 g. illite | 0.7 | 1.1 | 0.8 |

An examination of Table II shows a pronounced inhibition of the swelling of the clay in the water containing CMC in accordance with the invention. The inhibition is most striking in the case of the montmorillonite which is the most troublesome of the clays generally encountered in the practice of treating subterranean strata.

To further show the effectiveness of the presence of a cellulose derivative as described herein, the examples summarized in Table III below employing brine were run. To simulate brine encountered in earth strata for purposes of the examples a synthetic brine was prepared by admixing in water the following salts in the amounts set out below:

Salt: Grams/gallon
NaCl ---------------------------------- 280.8
CaCl$_2$ ---------------------------------- 121.3
MgCl$_2$·6H$_2$O ---------------------------------- 56.3
Na$_2$SO$_4$ ---------------------------------- 0.9

The brine thus prepared contained a total of about 104,000 p.p.m. total solids. This brine was then diluted with water so as to contain about 13,000 p.p.m. of total solids.

Equal size samples of the above brine, designated A, and of fresh water, designated B, were prepared. Except for the Blank which was run for comparison purposes, a cellulose derivative in the amount shown in Table III, was added to each sample. The weight of montmorillonite shown in Table III was then admixed per 100 milliliters of each of the brine and water samples in a Waring blender to make a slurry of each. The samples thus made were designated Examples 4 to 14 and evaluated for swelling of the clay by employing ASTM Test D 96–52T as in Examples 1 to 3. The results are also set out in Table III.

TABLE III

*Effects of various cellulose derivatives on the swelling of montmorillonite in brine and fresh water*

| Example | Cellulose Derivative, g./100 ml. Solution | Volume in Brine [1] (ml.) | Volume in Fresh Water (ml.) |
|---|---|---|---|
| Blank | None | 0.55 | 2.00 |
| 4 | 0.02 carboxy methyl cellulose | 0.37 | 0.31 |
| 5 | 0.02 carboxy methyl hydroxy ethyl cellulose. | 0.39 | 0.55 |
| 6 | 0.02 hydroxy ethyl cellulose | 0.40 | 0.60 |
| 7 | 0.02 methyl cellulose (4,000 cps. Visc.) | 0.49 | 1.90 |
| 8 | 0.08 methyl cellulose (4,000 cps. Visc.) | 0.41 | 0.60 |
| 9 | 0.02 ethyl cellulose (200 cps. Visc.) | 0.50 | 1.75 |
| 10 | 0.08 ethyl cellulose (200 cps. Visc.) | 0.41 | 0.45 |
| 11 | 0.08 methyl cellulose (1,500 cps. Visc.) | 0.45 | 0.63 |
| 12 | 0.08 methyl cellulose (50 cps. Visc.) | 0.44 | 0.68 |
| 13 | 0.08 cellulose acetate | 0.42 | 0.60 |
| 14 | 0.08 cellulose acetate butyrate | 0.48 | 0.80 |

[1] 13,000 p.p.m. solids.
The volume of 0.02 gram of the clay slurried in kerosene after centrifugation was 0.3 milliliter.

An examination of Table III shows that the swelling was reduced in both the fresh water and brine and that there is a greater tendency for the clay to swell in the fresh water than in the brine.

Examples were made to ascertain the range of cellulose derivatives to employ in fresh water. Equal volume samples of fresh water were prepared. Varying amounts of CMC were admixed with fresh water except in the Blank which was run as water only for comparison. 0.2 gram of montmorillonite clay was then dispersed per hundred milliliters of the fresh water thus treated. A like amount was also admixed with the same volume of kerosene for comparison. Thereafter the resulting slurries were centrifuged as in the above examples. The volume of the clay in water after centrifugation is set out in Table IV. The volume occupied by the clay in kerosene after centrifugation was 0.3 milliliter.

TABLE IV

*Effect of various concentrations of CMC in fresh water to reduce the swelling of clay*

| Example | Concentration CMC (g./100 ml. Solv.) | Volume Clay In Fresh Water (ml.) |
|---|---|---|
| Blank | None | 2.0 |
| 15 | 0.005 | 1.4 |
| 16 | 0.01 | 0.93 |
| 17 | 0.02 | 0.31 |
| 18 | 0.04 | 0.31 |
| 19 | 0.1 | 0.31 |

An examination of Table IV shows that CMC in an amount between 0.005 and 0.1 gram per hundred milliliters of water is effective in the practice of the invention. However, 0.02 to 0.04 gram per hundred milliliters is a preferred range.

To show the effect of heat on clay contacted by an aqueous solution, with or without the cellulose derivative therein, the examples summarized in Table V were run. Two pairs of samples were run at the four temperatures set out in Table V in the following manner: Eight aqueous solutions were made up, four of which contained 0.02 gram of CMC per hundred milliliters of water designated Examples 20 to 23, and four of which had no cellulose derivative added thereto designated Blanks. Two solutions consisting of 1 of each of the solutions described above were heated to the temperatures set out in Table V and centrifuged as in the preceding examples. The volume of the clay after centrifugation is set out in the table.

TABLE V

*Effect of temperature on swelling of montmorillonite using CMC in fresh water*

| Example | Concentration CMC (g./100 ml. Solv.) | Temperature (°F.) | Volume Clay In Fresh Water (ml.) |
|---|---|---|---|
| Blank | None | 80 | 2.00 |
| 20 | 0.02 | 80 | 0.30 |
| Blank | None | 130 | 2.15 |
| 21 | 0.02 | 130 | 0.32 |
| Blank | None | 150 | 2.50 |
| 22 | 0.02 | 150 | 0.32 |
| Blank | None | 200 | 2.55 |
| 23 | 0.02 | 200 | 0.33 |

An examination of Table V shows that the swelling of the montmorillonite clay containing the cellulose derivative at 80°, 130°, 150° and 200° F. is definitely less in contrast to the swelling which occurred when no cellulose derivative was present.

The process of fracturing formations traversed by a well according to the invention results in substantially increased production with only insignificant increases in the cost of material and labor.

Having described the invention, what is claimed and desired to be protected by Letters Patent is:

1. The process of treating earth strata containing argillaceous material which consists essentially of injecting into said strata through a well therein an aqueous treating liquid having a pH between 5.5 and 11.0 and containing between 0.005 and 0.1 gram of a water-soluble cellulose derivative per 100 milliliters of the treating liquid.

2. The process according to claim 1, wherein said cellulose derivative is a cellulose ester.

3. The process according to claim 1, wherein the cellulose derivative is a cellulose ether.

4. The process according to claim 3, wherein said cellulose ether is selected from the class consisting of simple cellulose ethers, hydroxyalkylcellulose ethers, mixed cellulose ethers, carboxyalkylcellulose ethers, and carboxyalkylhydroxyalkylcellulose ethers.

5. The process according to claim 4, wherein the carboxyalkylcellulose ether is carboxymethylcellulose.

6. The process according to claim 4, wherein the carboxyalkylhydroxyalkyl cellulose ether is carboxymethylhydroxyethylcellulose.

7. In the process of fracturing a fluid-producing formation containing argillaceous strata by the injection of an aqueous fracturing liquid into the formation at sufficient pressure to cause fracture the improvement which consists of admixing with said fracturing liquid between 0.005 and 0.1 gram per 100 milliliters of a cellulose derivative prior to said injection.

8. The process according to claim 7, wherein the cellulose derivative is prepared as an aqueous slurry and injected at the well head into the fracturing fluid during the injection thereof.

9. In the process of driving petroleum fluids in a clay-containing formation traversed by a well toward said well by means of an aqueous liquid injected into the formation the improvement consisting of admixing with said liquid, prior to its contacting the clay in said formation, between 0.005 and 0.1 gram of a cellulose derivative per 100 milliliters of said liquid.

References Cited in the file of this patent

UNITED STATES PATENTS

| | | |
|---|---|---|
| 2,731,414 | Binder et al. | Jan. 17, 1956 |
| 2,761,837 | Brown et al. | Sept. 4, 1956 |
| 2,778,427 | Cardwell et al. | Jan. 22, 1957 |
| 2,782,859 | Garst | Feb. 26, 1957 |
| 2,801,218 | Menaul | July 30, 1957 |